US011740328B2

(12) United States Patent
Abatzoglou et al.

(10) Patent No.: US 11,740,328 B2

(45) Date of Patent: Aug. 29, 2023

(54) METHODS AND SYSTEMS FOR PROCESSING RADAR SIGNALS

(71) Applicant: DC-001, Inc., Redonda Beach, CA (US)

(72) Inventors: Theagenis J. Abatzoglou, Dana Point, CA (US); Wenwei Zhou, Marietta, GA (US)

(73) Assignee: DC-001, INC., Redonda Beach, CA (US)

( * ) Notice: Subject to any disclaimer, the term of this patent is extended or adjusted under 35 U.S.C. 154(b) by 208 days.

(21) Appl. No.: 17/375,994

(22) Filed: Jul. 14, 2021

(65) Prior Publication Data

US 2022/0187424 A1 Jun. 16, 2022

Related U.S. Application Data

(60) Provisional application No. 63/125,977, filed on Dec. 16, 2020.

(51) Int. Cl.

| | |
|---|---|
| ***G01S 7/41*** | (2006.01) |
| ***G01S 13/00*** | (2006.01) |
| ***G01S 7/02*** | (2006.01) |
| *G01S 13/02* | (2006.01) |

(52) U.S. Cl.

CPC .............. *G01S 7/418* (2013.01); *G01S 7/023* (2013.01); *G01S 13/003* (2013.01); *G01S 2013/0245* (2013.01)

(58) Field of Classification Search

CPC ........ G01S 7/418; G01S 7/023; G01S 13/003; G01S 2013/0245

See application file for complete search history.

(56) References Cited

U.S. PATENT DOCUMENTS

| | | | | |
|---|---|---|---|---|
| 9,869,762 | B1 * | 1/2018 | Alland | H01Q 21/08 |
| 2005/0035894 | A1 | 2/2005 | Dean et al. | |
| 2011/0002371 | A1 | 1/2011 | Forenza et al. | |
| 2012/0068881 | A1 * | 3/2012 | Abatzoglou | G01S 13/904 342/159 |
| 2017/0102458 | A1 | 4/2017 | Schuman et al. | |
| 2018/0011180 | A1 * | 1/2018 | Warnick | H01Q 3/34 |
| 2020/0158861 | A1 * | 5/2020 | Cattle | G01S 13/89 |
| 2020/0300965 | A1 * | 9/2020 | Wu | G01S 7/2883 |
| 2021/0040583 | A1 * | 2/2021 | Dai | H01M 4/685 |
| 2021/0373144 | A1 * | 12/2021 | Amani | G01S 13/06 |
| 2022/0115725 | A1 * | 4/2022 | Liu | H01M 50/186 |
| 2022/0187424 | A1 * | 6/2022 | Abatzoglou | G01S 7/418 |

* cited by examiner

*Primary Examiner* — Marcus E Windrich

(74) *Attorney, Agent, or Firm* — Maynard Nexsen PC Ilya S. Mirov

(57) ABSTRACT

The present disclosure generally pertains to systems and methods for processing radar signals from a sparse MIMO array. In some embodiments, the signals from a MIMO radar array are processed to generate a sparse virtual array. Then, by using a two-dimensional (2D) variant of missing-data iterative adaptive approach (missing-data IAA or MIAA) to process the virtual array, the system can estimate information from the missing antennas of the sparse virtual array. Then, by using the now full virtually array, the system can process the virtual array using a variant of multi-dimensional folding (MDF) to discover the existence and location (e.g., distance, elevation, and azimuth) of objects (also called scatterers) within the MIMO radar array's field of view.

20 Claims, 12 Drawing Sheets

Radar Array Controller 416

414 408 402

409 409 410 409 409 409 410 409

406 412 412 413 412 412 412 413 412

415 406 412 412 413 412 412 412 413 412

405 407 413 413 413 413 413 413 413 413

406 412 412 413 412 412 412 413 412

404 Y X 403 411

204
Y
202
208
304
303
207
203
X
209
206
Radar Array Controller 211
210
205

METHODS AND SYSTEMS FOR PROCESSING RADAR SIGNALS

CROSS-REFERENCE TO RELATED APPLICATION

This disclosure claims the benefit of priority to U.S. Provisional Patent Application No. 63/125,977, filed on Dec. 16, 2020, which is incorporated herein by reference in its entirety.

TECHNICAL FIELD

The present disclosure generally relates to radar signal processing, and more particularly, methods, systems, and non-transitory computer readable media for processing radar signals using a MIMO radar array.

RELATED ART

Sensor systems that can be used to detect and monitor the environment are a key part of many modern-day technologies. In particular, sensor systems that are capable of monitoring an environment to detect the existence and location of objects in that environment are key to many advanced systems. A variety of technologies can be employed by a sensor system to detect objects in an environment. One such technology is radar, which has long be used for object detection. Especially for military applications, radar has long been used for long-range tracking, on the orders of several miles to several hundred miles, particularly for airborne objects. Radar uses radio waves to detect the relative location of objects, among other things. Radar can come in many forms, and for a variety of purposes, such as long range-radar antennas used to track planes in an airspace or to track objects in space.

One increasingly important use for radar is for detecting objects in a local environment—such as within several hundred meters—as opposed to the prior use of utilizing radar for more long-range tracking. Local object detection can be used for a variety of purposes, but may in particular be used to aid a system, such as a robot or self-driving car, in navigating through an environment. Radar has several advantages over other object detection systems in that it is unimpeded by inclement weather. However, radar suffers from some disadvantages. The most notable disadvantages are the poor spatial-resolution and poor Doppler-resolution of a basic radar system caused by the large wavelength of radio waves. The large wavelength makes it difficult to detect small objects or distinguish larger objects that are close to one another.

While systems have been developed to partially overcome this difficulty, these enhanced radar systems typically either still have a lacking amount of resolution or have requirements that make their use prohibitively expensive. For example, using multiple antennas can be cheap, but still leaves lacking resolution. As another example, using MIMO can provide necessary resolution, but requires such a large amount of antennas that the system is often cost prohibitive. Thus, better ways of enhancing the resolution of radar systems are greatly desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for processing radar signals from a sparse MIMO array. These systems are useful across a wide-range of industries for object detection and imaging, particular in systems capable of moving. By simultaneously accounting for the sparsity of the MIMO array and improving the accuracy above the baseline level of the MIMO array (i.e., super-resolution), a system of the present disclosure can enable the use of high-resolution radar imaging using fewer transmitters and receivers which, in turn, results in a correspondingly smaller footprint. More precisely, systems of the present disclosure may first process signals from a MIMO radar array to generate a sparse virtual array. Then, by using a two-dimensional (2D) variant of missing-data iterative adaptive approach (missing-data IAA or MIAA) to process the virtual array, the system can estimate information from the missing antennas of the sparse virtual array. Then, by using the now full virtually array, the system can process the virtual array using a variant of multi-dimensional folding (MDF) to discover the existence and location (e.g., distance, elevation, and azimuth) of objects (also called scatterers) within the MIMO radar array's field of view.

Figure 1:
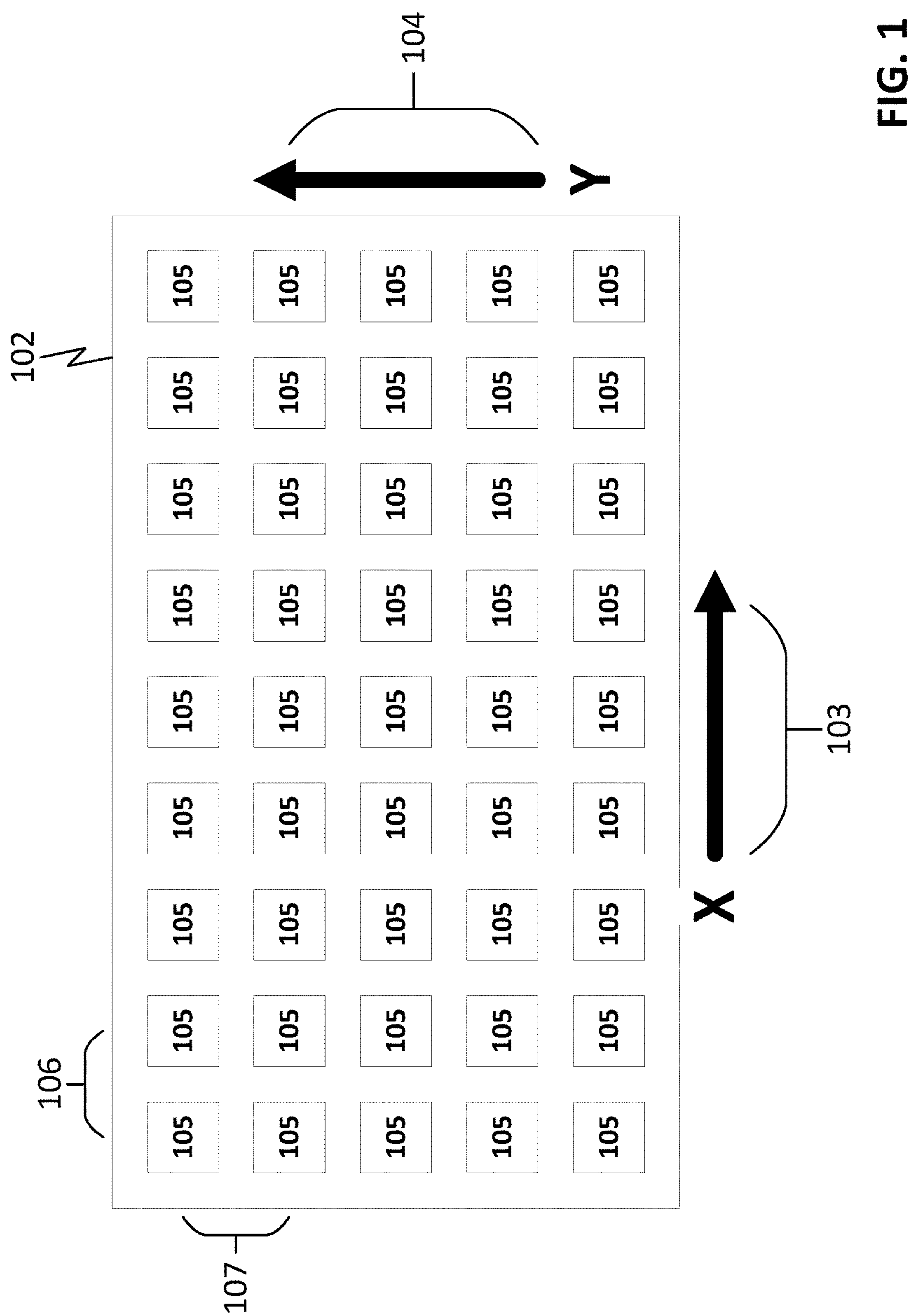
FIG. 1 is a block diagram of a two-dimensional (2D) phased array radar.

FIG. 1 shows a diagram of a two-dimensional (2D) phased array, such as could be used by a radar system. As shown by the figure, the 2D phased array 102 comprises a plurality of antennas 105. Each antenna 105 is part of an antenna element (not shown), which also comprises a computer-controlled phase shifter. Connected to each antenna 105 (e.g., connected to each antenna element through the antenna element's phase shifter) is a shared transmitter (not shown). In this instance, the 2D phased array 102 is as a planar array, with the antennas 105 being distributed in a grid (i.e., along an x-axis 103 and a y-axis 104). Like with most phased arrays, each antenna 105 of the 2D phased array 102 is uniformly distributed, with an x-axis spacing distance 106 between each antenna 105 in the x-axis direction and a y-axis spacing distance 107 between each antenna 105 in the y-axis direction.

In operation, the 2D phased array radar 102 works by having the transmitter connected to each of the antennas 105 generate a carrier-signal with a certain frequency. This carrier-signal is then transmitted to each of the antennas 105, which emit a corresponding sub-signal in the form of a spherical wavefront. Each of the sub-signals emitted by the antennas 105 share the same frequency, since the antennas 105 are powered by a common transmitter. However, the sub-signals emitted by the antennas 105 may not share the same phase. Each of the computer-controlled phase shifters connected to one of the antennas 105 (and which receive the carrier-signal generated by the transmitter before the signal is transmitted to the antennas 105) can alter the phase of the carrier-signal and can thus alter the sub-signals generated by each antenna 105 (e.g., by slightly delaying the generation of the sub-signal). By carefully controlling the phase of the sub-signal emitted by each antenna 105, the spherical wavefronts of the sub-signals emitted by the antennas 105 combine to form a superimposed signal in the form of a plane wave travelling in a specific direction. By changing the phases of the sub-signals generated by the individual antennas 105, the direction of the plane wave can be altered, allowing the signal from the overall 2D phased array 102 to be electronically steered.

As previously mentioned, the larger amount of antennas provides a phased array radar with a higher frequency resolution, which in turn provides a higher spatial resolution after processing the signals obtained from the 2D phased array 102. The 2D phased array also provides other advantages, such as the ability to electronically steer a generated radar signal (e.g., a radar beam) and the ability to electronically focus the detection of echoes from a generated radar signal. However, a phased array, such as the 2D phased array 102, has several disadvantages that render it impractical for certain applications. In particular, a phased array requires a large number of antennas 105, along with the associated supporting equipment, making a phased array radar with sufficient resolution often cost prohibitive due to the number of antennas (and antenna elements). This is particularly problematic for space-constrained applications, as it can be difficult to fit the necessary number of antennas 105 in the available footprint.

Figure 2:
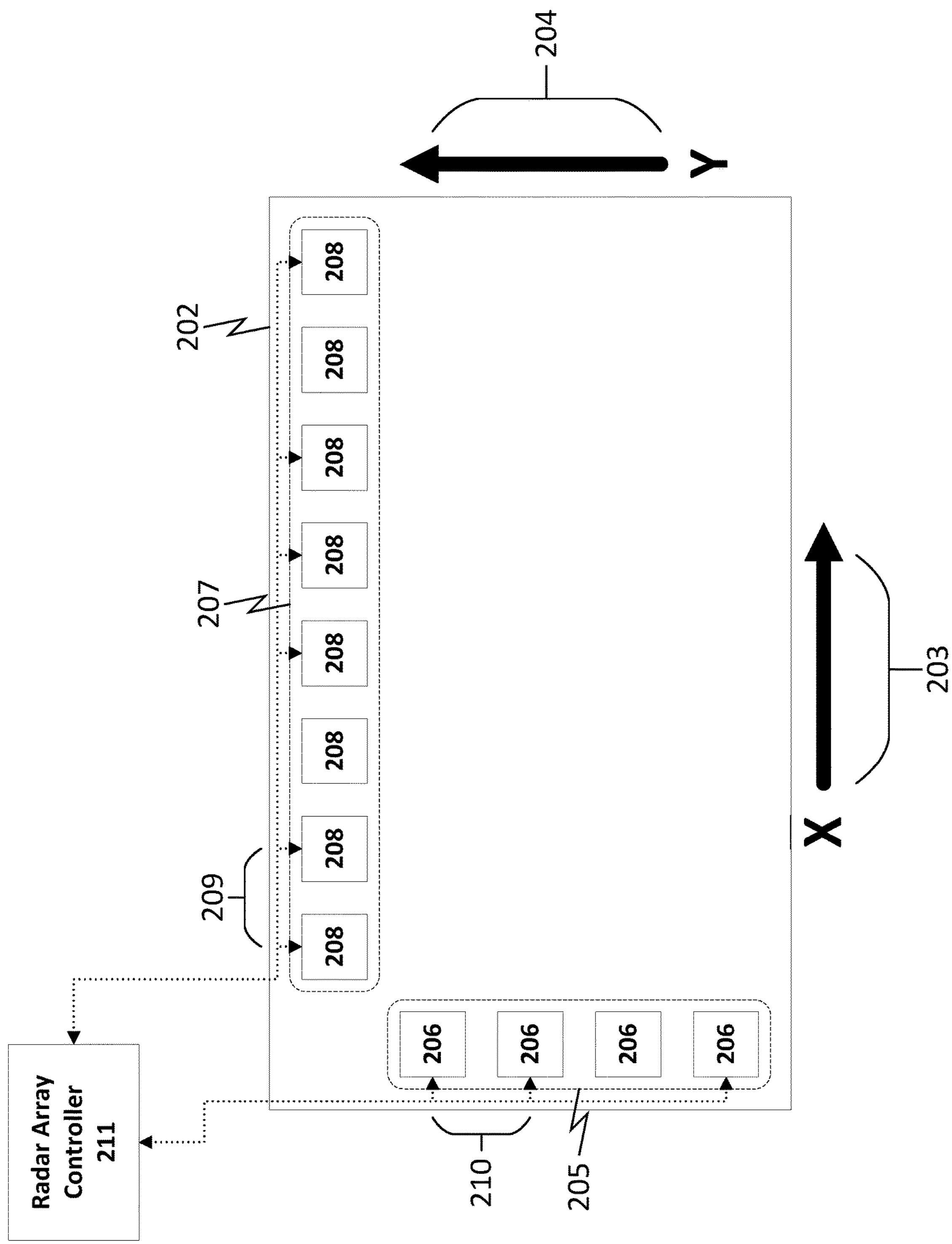
FIG. 2 is a block diagram of a full 2D multiple-input and multiple-output (MIMO) array.

To combat some of these issues, a multiple-input and multiple-output (MIMO) array, which can be considered an advanced variant of a phased array, can be used to obtain a similar level of resolution using far fewer antennas. FIG. 2 shows a diagram of a full two-dimensional (2D) MIMO array. As shown by the figure, the 2D MIMO array 202 may comprise a transmitter array 205 and a receiver array 207. The transmitter array 205 comprises a plurality of transmitter antennas 206, each of which is part of a transmitter element. Similarly, the receiver array 207 comprises a plurality of receiver antennas 208, each of which is part of a receiver element.

Figure 9:
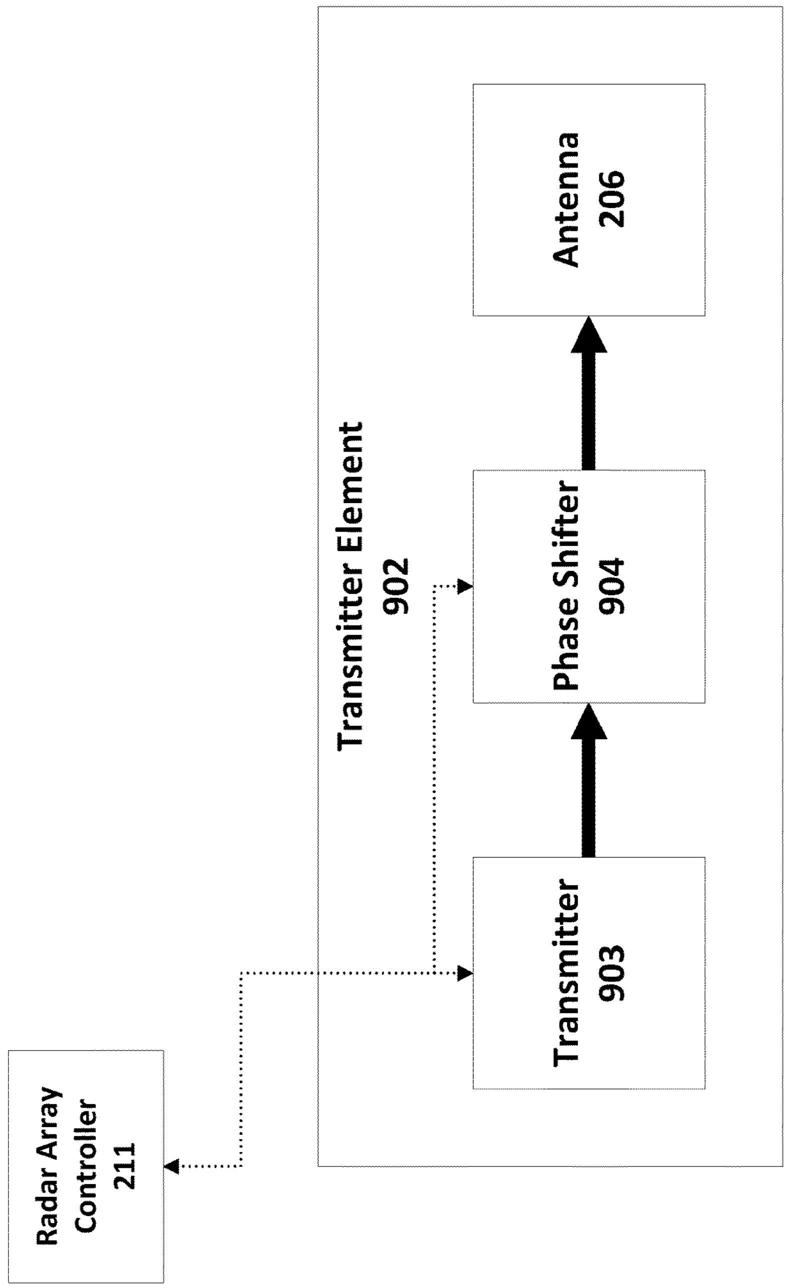
FIG. 9 is a block diagram of a transmitter element of a full 2D MIMO array, such as the full 2D MIMO array of FIG. 2

FIG. 9 shows a diagram of a transmitter element. As shown by the figure, a transmitter element 902 may comprise, in addition to the transmitter antenna 206, a computer-controlled transmitter 903 and a computer-controlled phase shifter 904. The transmitter 903 is connected to the phase shifter 904 which, in turn, is connected to the transmitter antenna 206. In operation, the transmitter 903 generates an electrical signal with a certain frequency, amplitude, and phase according to commands received from a radar array controller 211. The phase shifter 904 then receives this electrical signal and modifies its phase according to commands received from the radar array controller 905. The transmitter antenna 206 then receives the modified electrical signal and emits a corresponding radio wave signal.

Figure 10:
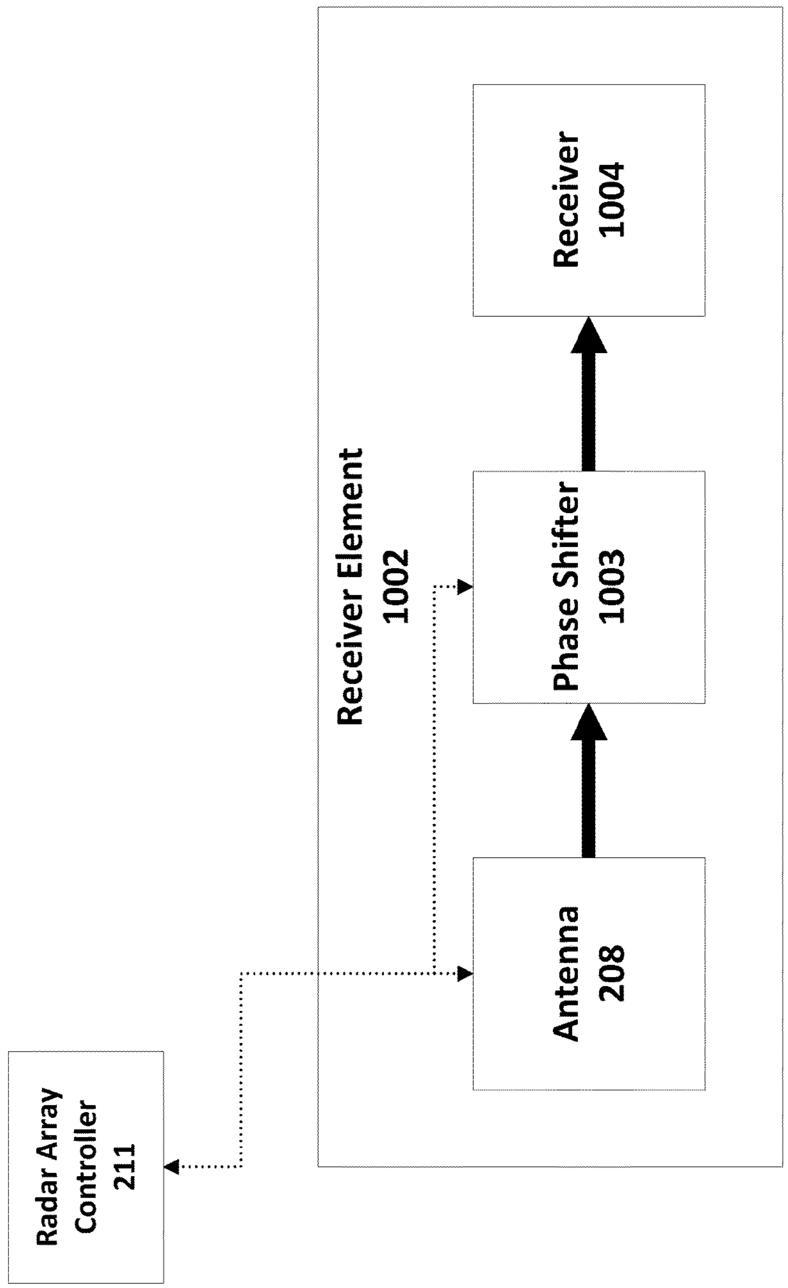
FIG. 10 is a block diagram of a receiver element of a full 2D MIMO array, such as the full 2D MIMO array of FIG. 2

FIG. 10 shows a diagram of a receiver element. As shown by the figure, a receiver element 1002 may comprise, in addition to the receiver antenna 208, a computer-controlled phase shifter 1003 and a computer-controlled receiver 1004. The receiver antenna 208 is connected to the phase shifter 1003 which, in turn, is connected to the receiver 1004. In operation, the receiver antenna 208 receives a radio wave signal and generates a corresponding electrical signal with a certain frequency, amplitude, and phase. The phase shifter 1003 then receives this electrical signal and modifies its phase according to commands received from the radar array controller 211. The receiver 1004 then receives the modified electrical signal and measures the signal for further processing.

In this instance, the 2D MIMO array 202 is a planar array, with the transmitter antennas 206 aligned along a y-axis 204 and the receiver antennas 208 aligned along an x-axis 203 (and also aligned orthogonal to the transmitter antennas 206). Like with many MIMO arrays, each transmitter antenna 206 of the transmitter array 205 is uniformly distributed, with a y-axis spacing distance 210 between each transmitter antenna 206 in the y-axis direction. Similarly, each receiver antenna 208 of the receiver array 207 is uniformly distributed, with an x-axis spacing distance 209 between each receiver antenna 208 in the x-axis direction.

In operation, the 2D MIMO array 202 works similarly to the 2D phased array 102. Specifically, the MIMO array 202 works by having the transmitter connected to each of the transmitter antennas 206 generate a carrier-signal with certain frequencies. The carrier-signal is then transmitted to each of the antennas 105 which, emit corresponding sub-signals in the form of a spherical wavefront. However, unlike with the 2D phased array 102, because each transmitter antenna 206 is driven by a carrier-signal generated by different computer-controlled transmitters, each of the sub-signals emitted by the transmitter antennas 206 may have different (and mutually orthogonal) frequencies. In a similar manner, each of the receiver antennas 208, which have individual computer-controlled receivers, are also capable of independent measurement of a signal. Additionally, like with the 2D phased array 102, each of the sub-signals emitted by the transmitter antennas 206 may not share the same phase. Each of the computer-controlled phase shifters connected to one of the transmitter antennas 206 (and which receiver the carrier-signal generated by the associated transmitter before the carrier-signal is transmitted to the transmitter antennas 206) can alter the phase of the carrier-signal transmitter antenna 206 (e.g., by slightly delaying the generation of the sub-signal). By carefully controlling the phase of the sub-signal emitted by each transmitter antenna 206, the spherical wavefronts of the sub-signals emitted by the transmitter antenna 206 combine to form a superimposed signal in the form of a plane wave travelling in a specific direction. By changing the phases of the sub-signals generated by the individual transmitter antennas 206, the direction of the plane wave can be altered, allowing the signal from the overall 2D MIMO array 202 to be electronically steered.

As previously mentioned, a MIMO array can provide resolution similar to a phased array while using significantly fewer antennas than in other radar systems. More precisely, a full 2D MIMO array with a transmitter array having m transmitter antennas and a receiver array having n receiver antennas can provide resolution equivalent to a 2D planar array having m*n transceiver antennas (e.g., having m rows of n columns of antennas that generate a signal (with a common frequency but possibly different phase) and that can (individually) measure the frequency and phase of a received signal). The way this is accomplished is by having each transmitter antenna 206 transmit a sub-signal that is independent and orthogonal to the sub-signals transmitted by any other transmitter antenna 206. Similarly, each receiver antenna 208 can independently receive and measure an echo of the combined sub-signals independent from any other receiver antenna 208. These two abilities, along with the layout and spacing of the transmitter antennas and receiver antennas, enable each signal (i.e., the combination of the sub-signals generated by transmitter antennas 206) measured by a receiver antenna 208 to be processed to extract and identify (properties of) the sub-signals. These extracted sub-signals (e.g., n sets of m sub-signals) can then be used to form a virtual array with an m*n grid of virtual antennas and to calculate the value of the signal (as measured by the receiver antennas 208) for each of those virtual antennas.

Figure 3:
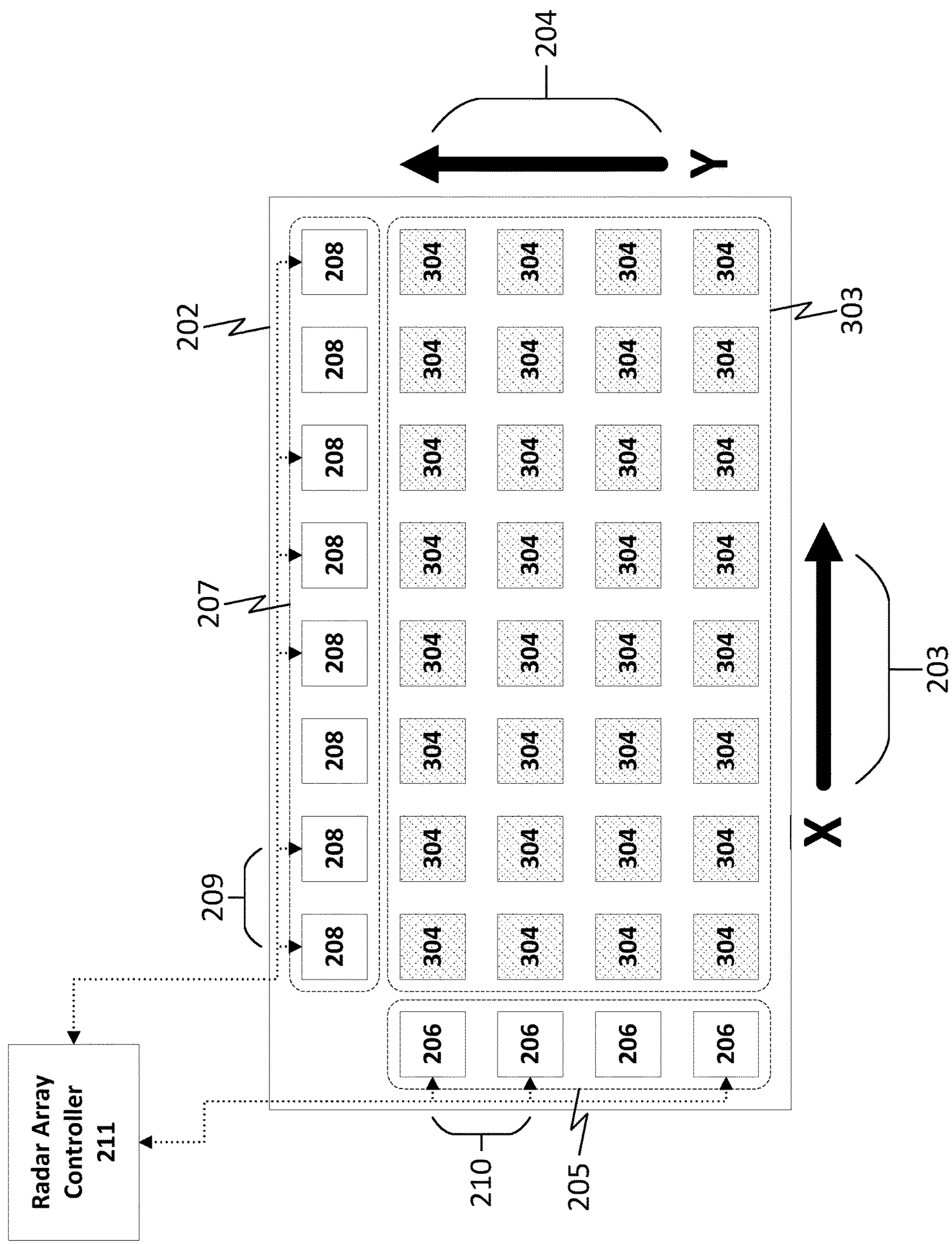
FIG. 3 is a block diagram of a virtual array created by the full 2D MIMO array of FIG. 2.

For example, FIG. 3 shows a diagram of a virtual array created by the full 2D MIMO array of FIG. 2. As shown by the figure, careful processing of the signals received by transmitter antennas 208 can yield a virtual array 303. The virtual array 303 comprises virtual antennas 304, with the value of the signal "measured" by the virtual antennas 304 being computed using the sub-signals (originating from the transmitter antennas 206) extracted from the signal measured by each of the receiver antennas 208.

Note that what makes the MIMO array 202 of FIG. 2 and its associated virtual array 303 (of FIG. 3) "full" is the spacing and position of the transmitter antennas 206 and the receiver antennas 208. In other words, a full virtual array is one where every virtual antenna is uniformly distributed in a grid, with no virtual antennas missing. A full MIMO array is an arrangement of transmitter antennas 206 and receiver antennas 208 that generates a full virtual array. Many arrangements of transmitter antennas and receiver antennas can yield a full MIMO array. For a MIMO array such as the MIMO array 202, where the transmitter antennas 206 are aligned along one direction and the receiver antennas 208 are aligned along an orthogonal direction, a full MIMO array requires that each transmitter antenna 206 be uniformly spaced (i.e., spaced with the y-axis spacing distance 210) with no gaps and that each receiver antenna 208 be likewise uniformly spaced (i.e., spaced with the x-axis spacing distance 209) with no gaps.

For MIMO arrays arranged like the 2D MIMO array 202, if there are gaps in the spacing between transmitter antennas 206 or receiver antennas 208, the array is called a sparse MIMO array. When processed, a sparse MIMO array yields a sparse virtual array, with certain virtual antennas 304 (and the value of the signal associated with these antenna antennas) missing.

Figure 4:
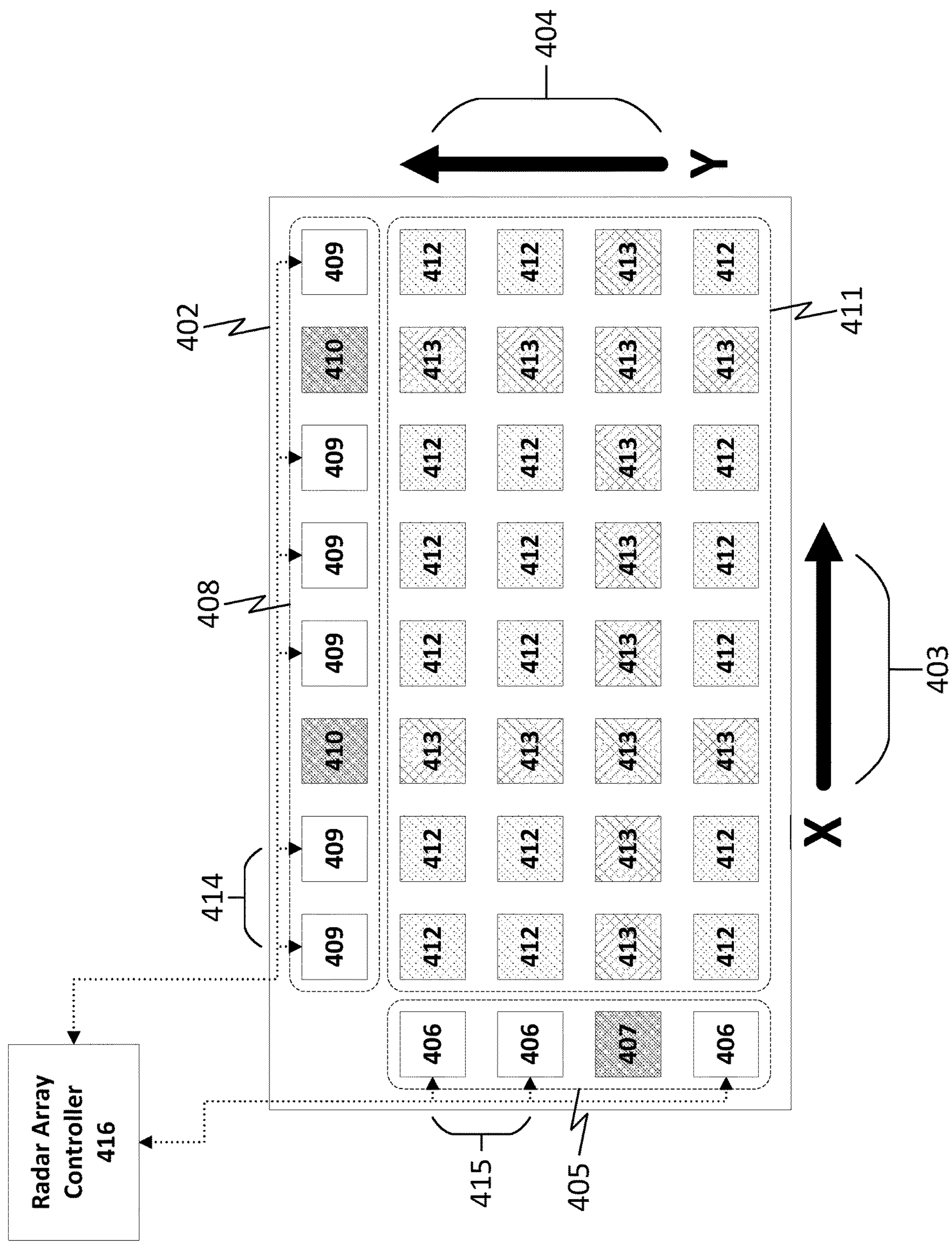
FIG. 4 is a block diagram of a sparse 2D MIMO array and its associated virtual array in accordance with an exemplary embodiment of the present disclosure.

For example, FIG. 4 shows a diagram of a sparse two-dimensional (2D) MIMO array and its associated virtual array in accordance with an exemplary embodiment of the present disclosure. As shown by the figure, the sparse 2D MIMO array 402 may comprise a transmitter array 405 and a receiver array 408. The transmitter array 405 comprises a plurality of available transmitter antennas 406, each of which is part of a transmitter element. Similarly, the receiver array 408 comprises a plurality of available receiver antennas 409, each of which is part of a receiver element.

Figure 11:
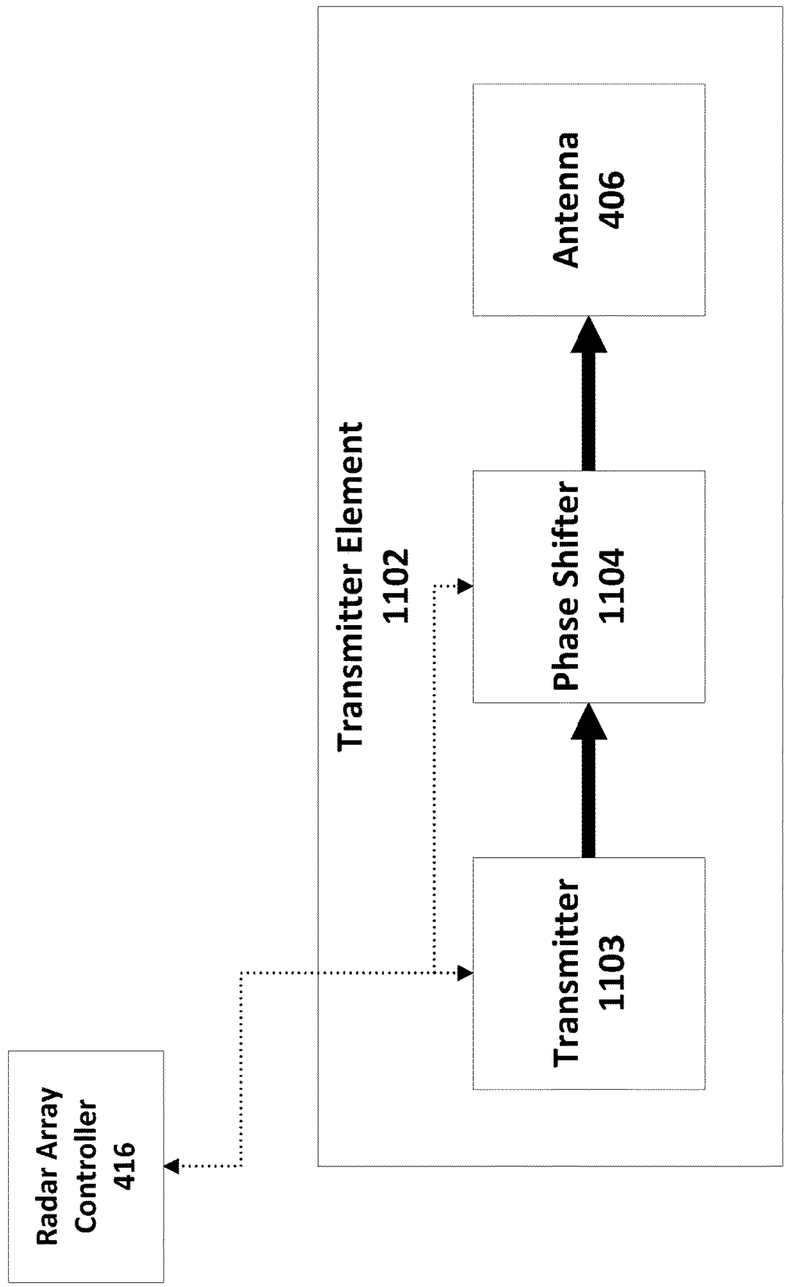
FIG. 11 is a block diagram of a transmitter element of a sparse 2D MIMO array, such as the sparse 2D MIMO array of FIG. 4

FIG. 11 shows a diagram of a transmitter element. As shown by the figure, a transmitter element 1102 may comprise, in addition to the available transmitter antenna 406, a computer-controlled transmitter 1103 and a computer-controlled phase shifter 1104. The transmitter 1103 is connected to the phase shifter 1104 which, in turn, is connected to the available transmitter antenna 406. In operation, the transmitter 1103 generates an electrical signal with a certain frequency, amplitude, and phase according to commands received from a radar array controller 416. The phase shifter 1104 then receives this electrical signal and modifies its phase according to the commands received from the radar array controller 416. The available transmitter antenna 406 then receives the modified electrical signal and emits a corresponding radio wave signal.

Figure 12:
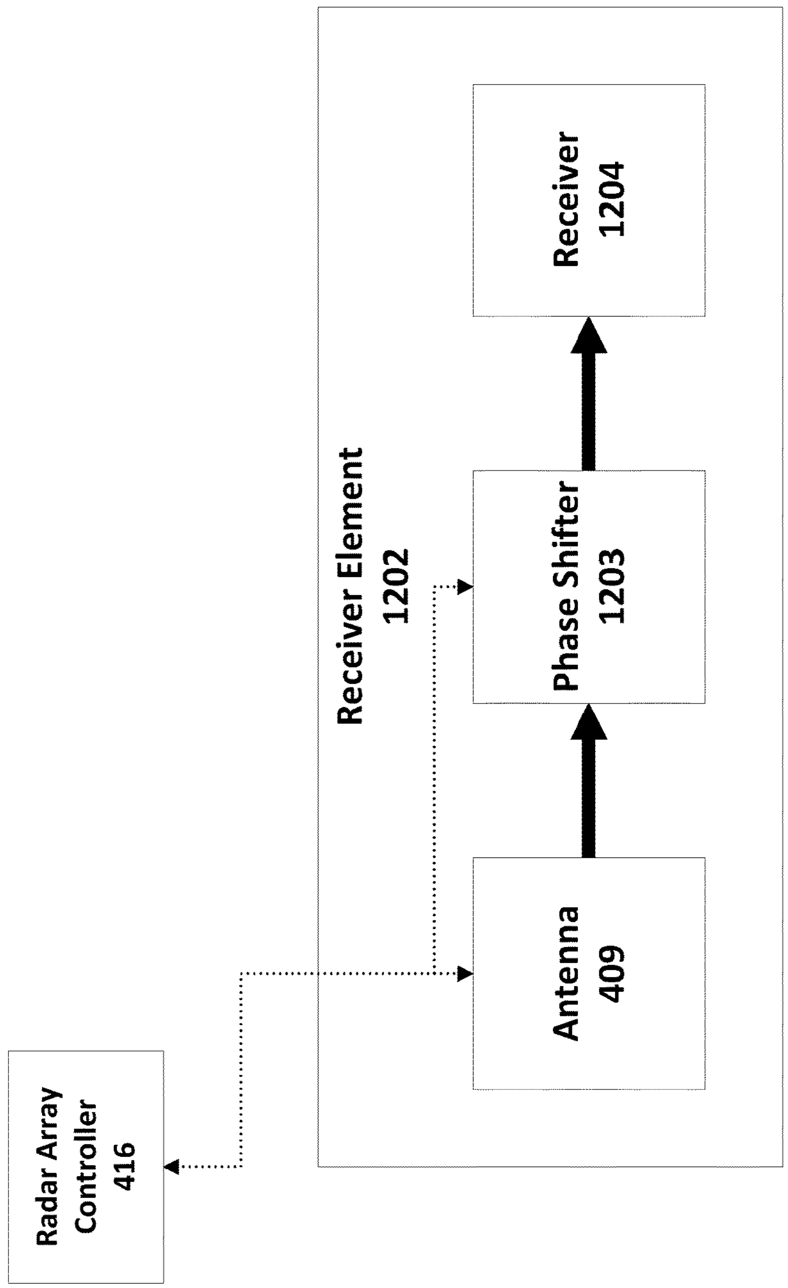
FIG. 12 is a block diagram of a receiver element of a sparse 2D MIMO array, such as the sparse 2D MIMO array of FIG. 4.

FIG. 12 shows a diagram of a receiver element. As shown by the figure, a receiver element 1202 may comprise, in addition to the available receiver antenna 409, a computer-controlled phase shifter 1203 and a computer-controlled receiver 1204. The available receiver antenna 409 is connected to the phase shifter 1203 which, in turn, is connected to the receiver 1204. In operation, the available receiver antenna 409 receives a radio wave signal and generates a corresponding electrical signal with a certain frequency, amplitude, and phase. The phase shifter 1203 then receives this electrical signal and modifies its phase according to commands received from the radar array controller 416. The receiver 1204 then receives the modified electrical signal and measures the signal for further processing.

In this instance, the sparse 2D MIMO array 402 is a planar array, with the available transmitter antennas 406 aligned along a y-axis 404 and the available receiver antennas 409 aligned along an x-axis 403 (and also aligned orthogonal to the available transmitter antennas 406). However, unlike with the full 2D MIMO array 202 of FIG. 2, each available transmitter antenna 406 of the transmitter array 405 is not uniformly distributed. Rather, each transmitter antenna 406 is spaced apart in multiples of a y-axis spacing distance 415, with multiples greater than one representing (depending on the multiple of the spacing) one or more skipped transmitter antennas (and transmitter antenna elements) called missing transmitter antennas 407. Similarly, unlike with the full 2D MIMO array 202 of FIG. 2, each available receiver antenna 409 of the receiver array 408 is not uniformly distributed. Rather, each receiver antenna 409 is spaced apart in multiples of a x-axis spacing distance 414, with multiples greater than one representing (depending on the multiple of the spacing) one or more skipped receiver antennas (and receiver antenna elements) called missing receiver antennas 410.

Connected to each of the available transmitter antennas 406 and available receiver antennas 409 is a radar array controller 416. The radar array controller 416 may interact with the transmitter and phase shifter associated with each of the transmitter antennas 406 to alter the frequency and phase of the sub-signals generated by the transmitter antennas 406, among other things. The radar controller 416 may also interact with the receiver associated with each of the receiver antennas 409 to obtain measurements of the radar signal being received by the receiver antennas 409. The radar array controller 416 may also process the signals received by the receiver antennas 409 for various purposes, such as to implement the method described in FIG. 5 below.

The radar array controller 416 may be implemented in hardware or a combination of hardware and software. As an example, the radar array controller 416 may comprise one or more field programmable gate arrays (FPGAs) or one or more application-specific integrated circuits (ASICs). In some embodiments, the radar array controller 416 may comprise one or more processors (e.g., central processing units (CPUs) or microprocessors) programmed with software that when executed by the processor cause the processor to perform the functions described herein for the radar array controller 416. In other embodiments, other configurations of the radar array controller 416 are possible.

Like with a full 2D MIMO array (e.g., the full 2D MIMO array 202), a sparse 2D MIMO array (e.g., the sparse 2D MIMO array 402) with a transmitter array having m available transmitter antennas and a receiver array having n available receiver antennas can provide resolution equivalent to a 2D planar array having m*n antennas. However, unlike a full 2D MIMO array, the virtual array resulting from processing the sub-signals extracted from each available receiver antenna 409 (e.g., n sets of m sub-signals) does not result in a virtual array with an m*n grid of available virtual antennas (e.g., having m rows of n columns of antennas that generate a signal (with a common frequency but possibly different phase) and that can (individually) measure the frequency and phase of a received signal). Rather, for a transmitter array having/missing transmitter antennas 407 and a receiver array having p missing receiver antennas 410, the resulting virtual array is an (m+l)*(n+p) grid of virtual antennas. The virtual array, despite its larger size, still only has m*n available virtual antennas. The remaining (i.e., not-available) virtual antennas (i.e., the remaining (m*p)+(l*n)+(l*p) virtual antennas) are called missing virtual antennas, since they are skipped over in the virtual array and the value of the signal at their location is missing.

The distribution of available virtual antennas and missing virtual antennas depends on the distribution of the available transmitter antennas 406 and missing transmitter antennas 407 within the transmitter array 405 and the distribution of the available receiver antennas 409 and the missing receiver antennas 410 with the receiver array 408. For example, FIG. 4 shows a sparse virtual array 411 resulting from processing the signals received by the available receiver antennas 409 of receive array 408. The virtual array 411 comprises available virtual antennas 412, with the value of the signal "measured" by the available virtual antennas 412 being computed using the sub-signals (originating from the available transmitter antennas 406) extracted from the signal measured by each of the available receiver antennas 409.

However, unlike the virtual array 303 of FIG. 3, the 2D MIMO array 402 is sparse, with missing transmitter antennas 407 and missing receiver antennas 410. These missing antennas result in missing virtual antennas 413 in the virtual array 411. More precisely, each virtual antenna whose value is associated with either a missing transmitter antenna 407 or missing receiver antenna 410 (or both) is skipped. Because of the particular layout of the transmitter array 405 and receiver array 408 of the MIMO array 402, a missing transmitter antenna 407 results in a row of missing virtual antennas 413 in virtual array 411. Similarly, because of the particular layout of the MIMO array 402, a missing receiver antenna 410 results in a column of missing virtual antennas 413 in virtual array 411.

Note that the particular arrangement of missing transmitter antennas 407 and missing receiver antennas 410 (i.e., which spacing are chosen to have antennas and which are chosen to be skipped) can have a significant performance impact on the 2D MIMO array 402. For a variety of reasons, some arrangements of available transmitter antennas 406, missing transmitter antennas 407, available receiver antennas 409, and missing receiver antennas 410 may yield better performance than other arrangements. Moreover, the relative performance of different arrangements may depend on the intended application of the 2D MIMO array 402 and the algorithm (or algorithms) used to process the radar signals. As a trivial example, a 2D MIMO array where all missing transmitter antennas 407 and/or all missing receiver antennas 410 are next to one another will have worse performance than a 2D MIMO array where the missing transmitter antennas 407 and/or the missing receiver antennas 410 are evenly dispersed in between the available transmitter antennas 406 and/or the available receiver antennas 409). The intuitive reason for this being that having the missing antennas dispersed essentially spreads the loss of information across the MIMO array, rather than having it concentrated into one large area. This allows algorithms, such as the one discussed below in FIG. 6, to estimate or otherwise "work around" the missing information.

A benefit of a sparse 2D MIMO array is that uses fewer transmitter antennas and receiver antennas and any associated supporting components. This simplifies the hardware, reducing its cost and complexity. It can make it easier (and thus, less expensive) to integrate a 2D MIMO array within a small footprint. However, a sparse 2D MIMO array results in the significant downside that its coverage has gaps, degrading its accuracy and resolution. Fortunately, it is possible to process the signals obtained using a sparse 2D MIMO array despite these gaps. However, the methods used to do so often impose strict criteria on how the MIMO array is sparse (e.g., all gaps must be uniform) and still have substantially degraded accuracy compared to an equivalent full 2D MIMO array. Moreover, the methods used to process signals from a sparse MIMO array are often extremely complex, requiring computational power that renders them impractical for many applications, particular those needing real-time processing.

To better address these issues, embodiments of the present disclosure may process radar signals using a combination of MIAA and MDF. Specifically, embodiments of the present disclosure may receive a plurality of samples of a radar signal from a MIMO array and process these signals to generate samples of the radar signal for available virtual antennas of a virtual array. The generated samples of the radar signal from the virtual array may then be used to determine a spectral density of the radar signal. After the spectral density of the radar signal is determined, the spectral density may be used to estimate samples of the radar signal for the missing antennas of the virtual array. The samples from both the available virtual antennas and the missing virtual antennas may then be processed using MDF to determine the elevation and azimuth of any objects (i.e., any scatterers) present in the field of view of the MIMO array.

Figure 5:
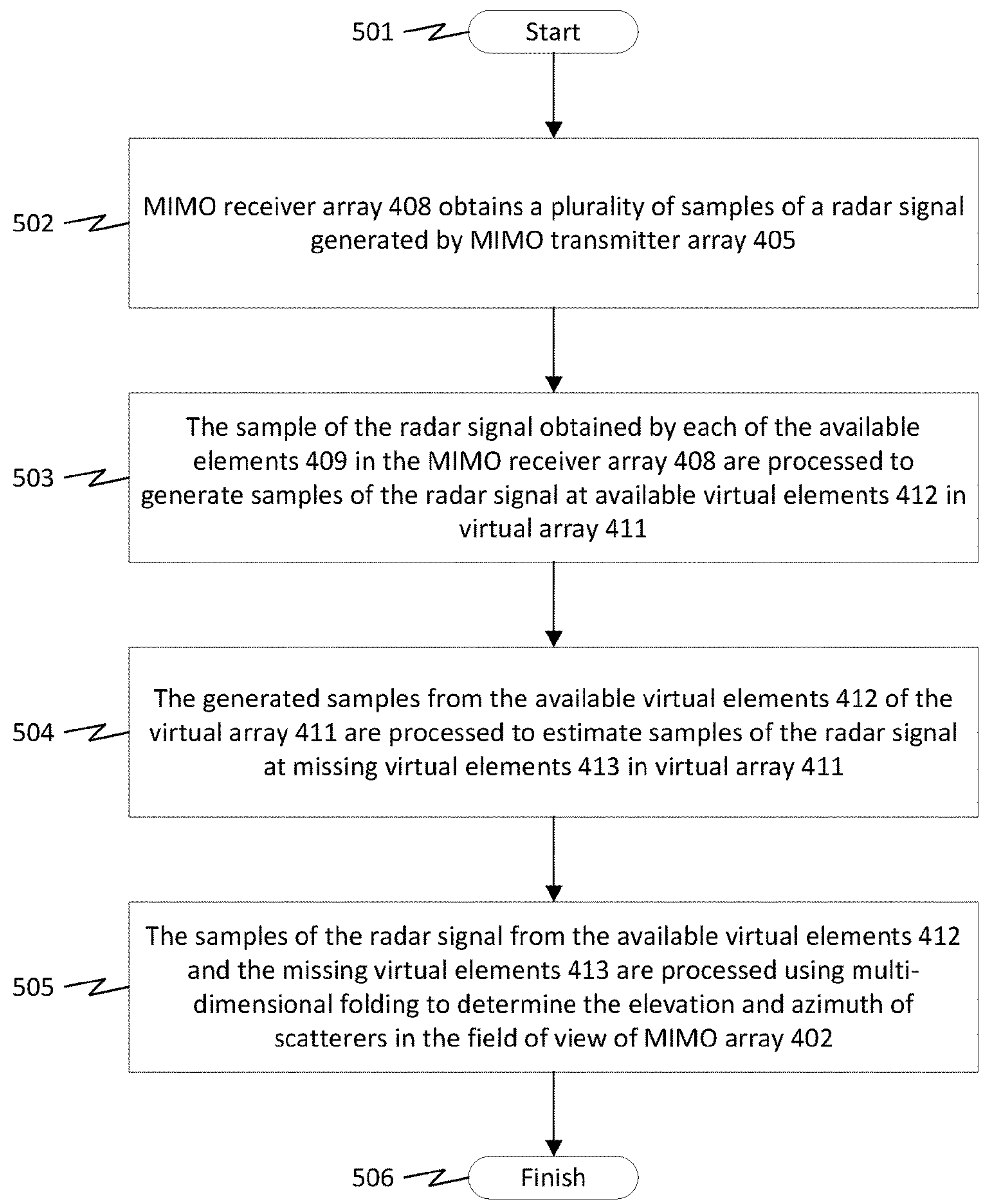
FIG. 5 is a flowchart of an exemplary method of processing radar signals, such as the ones created and measured by the sparse 2D MIMO array of FIG. 4.

FIG. 5 is a flowchart illustrating a process of processing radar signals as just described. To start, as shown by block 502 of FIG. 5, the MIMO receiver array 408 obtains a plurality of samples of a radar signal generated by the MIMO transmitter array 405. More precisely, the transmitter array 405 may generate a signal. This signal is composed of multiple, mutually orthogonal sub-signals, each generated by one of the available transmitter antennas 406. This signal propagates through free-space (e.g., the earth's atmosphere) for some distance, before encountering and reflecting off at least one object. This may occur at multiple distances and for multiple objects. When the signal reflects off an object, some of the reflected signal is directed towards the receiver array 408. After traveling the distance back to the receiver array 408, the signal is measured by each of the available receiver antennas 409 of the receiver array 408.

After the MIMO receiver array 408 obtains the plurality of signals, the plurality of signals are processed to obtain the virtual array 411. Specifically, as shown by block 503 of FIG. 5, the plurality of signals are processed to generate samples of the radar signal at available virtual antennas 412 in the virtual array 411. As previously discussed, because of their mutual orthogonality, a measurement for each sub-signal can be extracted from each of the measurements of the combined signal taken by the available transmitter antennas. Each of the sub-signal measurements (i.e., the measurement of a sub-signal from a particular available transmitter antennas 406 obtained from a particular available receiver antenna 409) corresponds to a value for a particular available virtual antenna in the virtual array 411. The positioning of the virtual antenna in the virtual array 411 (and the physical position it represents relative to the overall sparse MIMO array 402) resulting from a particular pair of transmitter antenna and receiver antenna depends on the relative positioning of the transmitter antenna and the receiver antenna.

Figure 6:
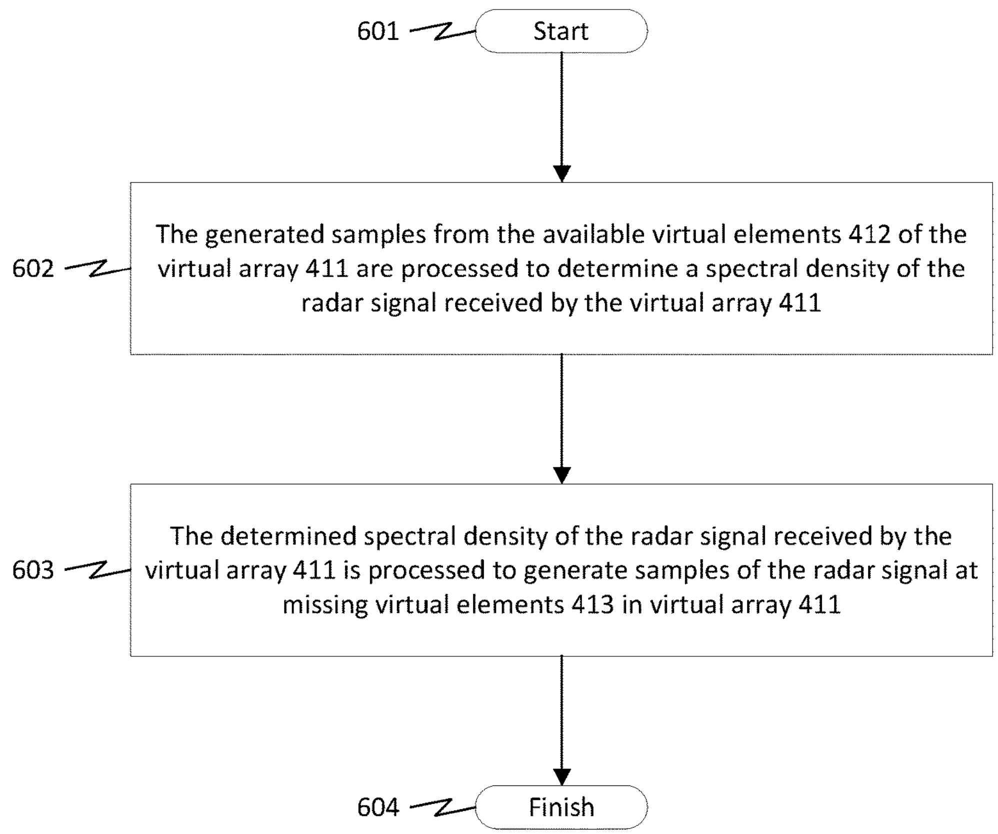
FIG. 6 is a flowchart of a first exemplary process of estimating samples of a radar signal for missing virtual antennas of a virtual array.

After the samples of the radar signal from the available virtual antennas 412 are generated, samples of the radar signal at the missing virtual antennas 413 may be generated. Specifically, as shown by block 504 of FIG. 5, the generated samples of the radar signal from the available virtual antennas 412 may be processed to estimate samples of the radar signal at missing virtual antennas 413 in virtual array 411. FIG. 6 is a flowchart illustrating an exemplary process of estimating samples of the radar signal at the missing virtual antennas 413 from the samples of the radar signal from the available virtual antennas 412. To start, as shown by block 602 of FIG. 6, the generated samples of the radar signal from the available virtual antennas 412 may be processed to determine a spectral density of the radar signal.

As a brief primer, the spectral density of a signal describes the amplitude (equivalently, the power) of a signal at various frequencies. For a 2D MIMO array like the sparse 2D MIMO array 402, the complete spectral density is 3-dimensional, with the independent data being two frequencies (one axis for a frequency along the x-axis 403 and one frequency for a frequency along the y-axis 404) and the dependent data being the amplitude of the signal at a given frequency pair.

To calculate the spectral density of the signal using the measurement of the signal from each available virtual antennas 412, one can generate two phase steering matrices, one for the x-axis frequency and one for the y-axis frequency. The y-axis phase steering matrix is a two-dimensional matrix where each row represents the value of a y-axis frequency component of the radar signal measured by each of the available virtual antennas 412. The columns of the matrix represent frequency sub-intervals which are determined by dividing the interval between −0.5 and 0.5 into (m+l)*i sub-intervals, where (m+l) is the size of the virtual array 411 along y-axis 404 and i is a sub-division factor. Each column of the matrix represents one of these frequency sub-intervals. To populate the matrix, for each row, the value of the available virtual antenna 412 is used. Essentially, the matrix is filled out as if all the value of a signal came from any (and all) of the specific frequency sub-intervals, with later steps determining which frequency sub-interval (or intervals) contribute to the signal's amplitude.

In a similar manner, the x-axis phase steering matrix is a two-dimensional matrix where each row represents the value of an x-axis frequency component of the radar signal measured by each of the available virtual antennas 412. The columns of the matrix represent frequency sub-intervals which are determined by dividing the interval between −0.5 and 0.5 into (n+p)*i sub-intervals, where (n+p) is the size of the virtual array 411 along the x-axis 403 and i is a sub-division factor. Each column of the matrix represents one of these frequency sub-intervals. To populate the matrix, for each row, the value of the available virtual antenna 412 is used. Essentially, the matrix is filled out as if all the value of a signal came from any (and all) of the specific frequency sub-intervals, with later steps determining which frequency sub-interval (or intervals) contribute to the signal's amplitude.

After generating the y-axis phase steering matrix and the x-axis phase steering matrix, a target backscatter matrix may be generated which indicates which of (and to what extent) the entries in the two phase steering matrixes are correct (i.e., which phase steering vectors are "correct"). The value of the target backscatter matrix may be iteratively calculated from the measurement of the signal from each of the virtual antennas 412 and a noise matrix representing the interference and noise covariance of the measurements of the available virtual antennas 412. In turn, the noise matrix may be calculated from the signal from each of the virtual antennas 412 and the current target backscatter matrix, with the first iteration using a noise matrix initialized as an identity matrix. Empirically, around 10 to 15 iterations of the process is typically sufficient such that further iterations give little or no increase in accuracy. Once the process is finished, the product of the y-axis phase steering matrix, the target backscatter matrix, and the x-axis phase steering matrix represents the spectral density of the signal.

After the spectral density of the radar signal is determined, samples of the radar signal from the missing virtual antennas 413 may be generated. Specifically, as shown by block 603 of FIG. 6, the determined spectral density of the radar signal may be processed to determine a value (e.g., a sample) of the radar signal at the location of each missing virtual antenna 413. Intuitively, since the radar sample is (ideally) now fully characterized in the form of its spectral density, the spectral density can be used to determine what signal a missing virtual antenna 413 would have measured if it had been available.

To calculate values (i.e., measurements of the signal) for the missing virtual antennas 413, a process similar to a reverse of the process described by block 602 of FIG. 6 is used. Two phase steering vectors for each of the missing virtual antennas 413 are generated, with the x-axis phase steering vector for each antenna 413 having entries for each of the (m+1)*i subdivisions of the range between −0.5 and 0.5. Likewise, the y-axis phase steering vector for each antenna 413 has entries for each of the (n+p)*i subdivisions of the range between −0.5 and 0.5. However, unlike the previous phase steering matrixes, the entries for the amplitude of each of the phase steering vectors is unknown. After being generated, the noise matrix and the target backscatter matrix are used to resolve these unknowns. The value of the signal at each of the missing virtual antennas 413 may then be extracted from their respective solved phase steering vectors.

After the samples of the radar signal at the missing virtual antennas 413 are determined, the samples of the radar signal may be processed to locate scatterers. Specifically, as shown by block 505 of FIG. 5, multi-dimensional folding (MDF)

may be used to process the samples of the radar signal from the available virtual antennas 412 and the missing virtual antennas 413 to determine the elevation and azimuth of scatterers in the field of view of MIMO array 402. MDF is a two-dimensional model based super-resolution technique that assumes the signal samples are a superposition of two-dimensional sinusoids. MDF is based on forming two-dimensional versions of the linear prediction matrices in one-dimension, using invariance properties of the forward and backward linear prediction matrices to find the two-dimensional frequencies from the roots of two one-dimensional polynomials. Further the elevation and azimuth angles are obtained from the 2 frequencies which are the directional angle cosines.

Figure 7:
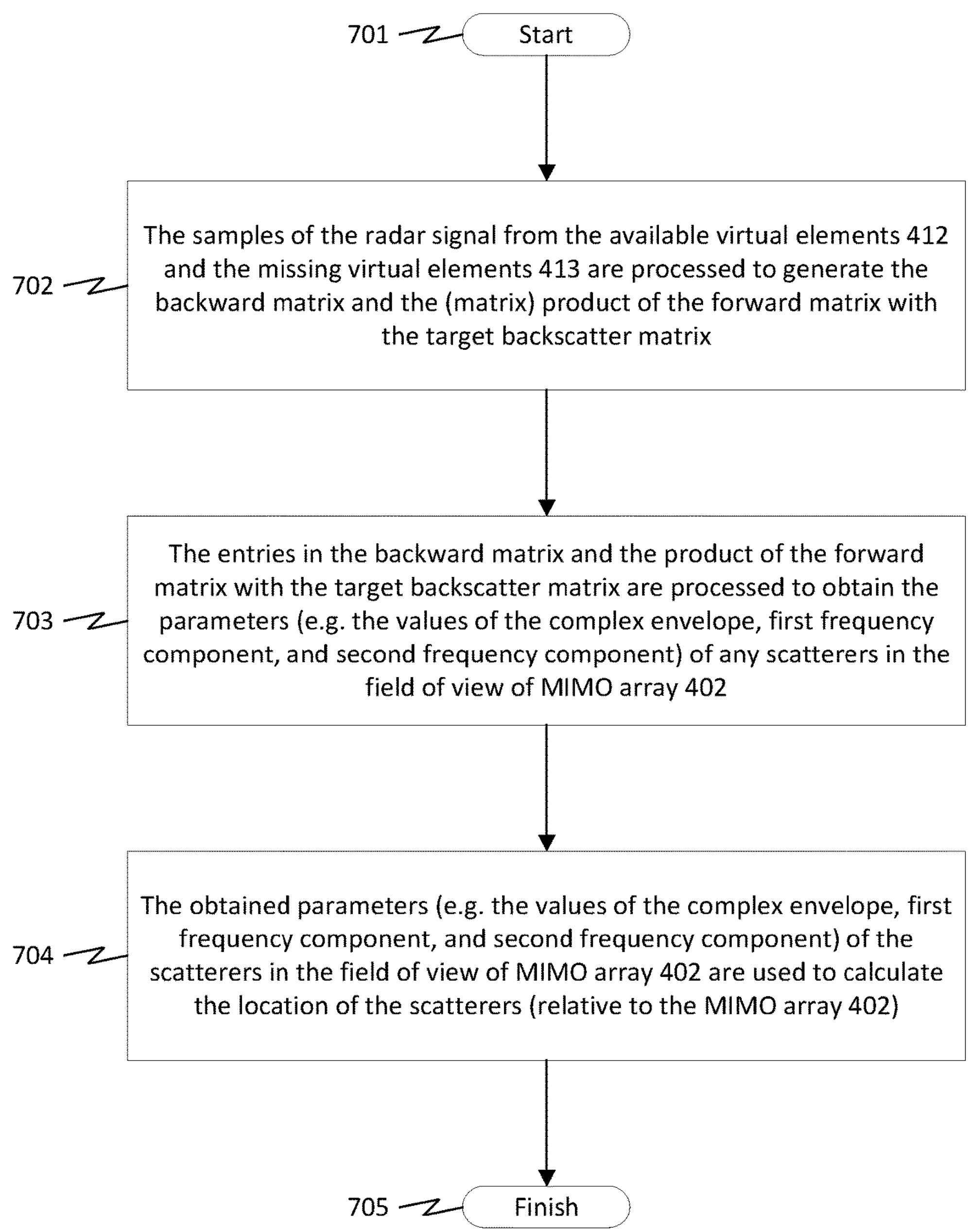
FIG. 7 is a flowchart of a first exemplary process of locating scatterers from samples of a radar signal.

FIG. 7 is a flowchart illustrating an exemplary process of locating scatterers from the samples of the radar signal from the virtual antennas of the virtual array 411. To start, as shown by block 702 of FIG. 7, the samples of the radar signal from the available virtual antennas 412 and the missing virtual antennas 413 may be processed to generate a backward matrix and a product of a forward matrix with a target backscatter matrix (the product of the forward matrix with the target backscatter matrix is itself a matrix).

To generate the backward matrix and the product of the forward matrix with the target backscatter matrix, one can generate two frequency mixture matrixes and then generate an eigenvector matrix from the two frequency mixture matrixes. Specifically, to obtain a first frequency mixture matrix, one can first generate a first expanded four-dimensional (4D) matrix from the samples of the radar signal. The first frequency mixture matrix can then be generated by folding the first expanded 4D matrix into a 2D matrix. Similarly, to obtain a second frequency mixture matrix, one can first generate a second expanded four-dimensional (4D) matrix from the conjugated samples of the radar signal. The second frequency mixture matrix can then be generated by folding the second expanded 4D matrix into a 2D matrix.

To obtain the eigenvector matrix, the first frequency mixture matrix and the second frequency mixture matrix may be used to generate a left singular vector matrix (i.e., the singular-value decomposition of a matrix generated from stacking the first frequency mixture matrix and the second frequency mixture matrix). The left singular value matrix may then be partitioned into a first left singular vector sub-matrix and a second left singular vector sub-matrix. The eigenvector matrix can then be generated from the product of the Hermitian transpose of the first left singular vector sub-matrix with the second left singular vector sub-matrix.

After the first frequency mixture matrix, the second frequency mixture matrix, and the eigenvector matrix are generated, the product of the forward matrix with the target backscatter matrix may be generated using the first frequency mixture matrix and the eigenvector matrix. And after the product of the forward matrix with the target backscatter matrix is generated, the backward matrix may be generated using the first frequency mixture matrix, the eigenvector matrix, and the product of the forward matrix with the target backscatter matrix.

After the backward matrix and the product of the forward matrix with the target backscatter matrix are generated, the parameters of any scatterers in the field of view of the MIMO array 402 may be obtained. Specifically, as shown by block 703 of FIG. 7, the entries in the backward matrix and the product of the forward matrix with the target backscatter matrix are processed to obtain the values of the complex envelope, first frequency component, and second frequency component of any scatterers in the field of view of MIMO array 402. The value of the complex envelope of any scatterers in the field of view of MIMO array 402 may be obtained from the entries in the product of the forward matrix with the target backscatter matrix. Similarly, the values of the first frequency component and the second frequency component of any scatterers in the field of view of MIMO array 402 may be obtained from the entries in the backward matrix.

After the parameters of any scatterers in the field of view of the MIMO array 402 are obtained, the location of the scatters may be calculated. Specifically, as shown by block 704 of FIG. 7, the values of the complex envelope, the first frequency component, and the second frequency component of each of the scatterers may be processed to obtain the location of the scatterer relative to the MIMO array 402.

Depending on parameters of the MIMO array 402, the method described in FIG. 6 to estimate samples of the radar signal at the missing virtual antennas 413 can be computationally expensive for some applications. For example, the algorithm may take unacceptably long on applications with lower computing power (e.g., due to space or weight restraints) or may be unable to meet requirements of applications with limits on response time (e.g., because of a need for real-time interaction). To address these issues, one can use a hybrid approach that uses a Fourier transform (and inverse Fourier transform) in combination with a one-dimensional (1D) variant of the MIAA algorithm. This method retains much of the accuracy of the full 2D MIAA algorithm, particular for scenes with a small number of objects.

Figure 8:
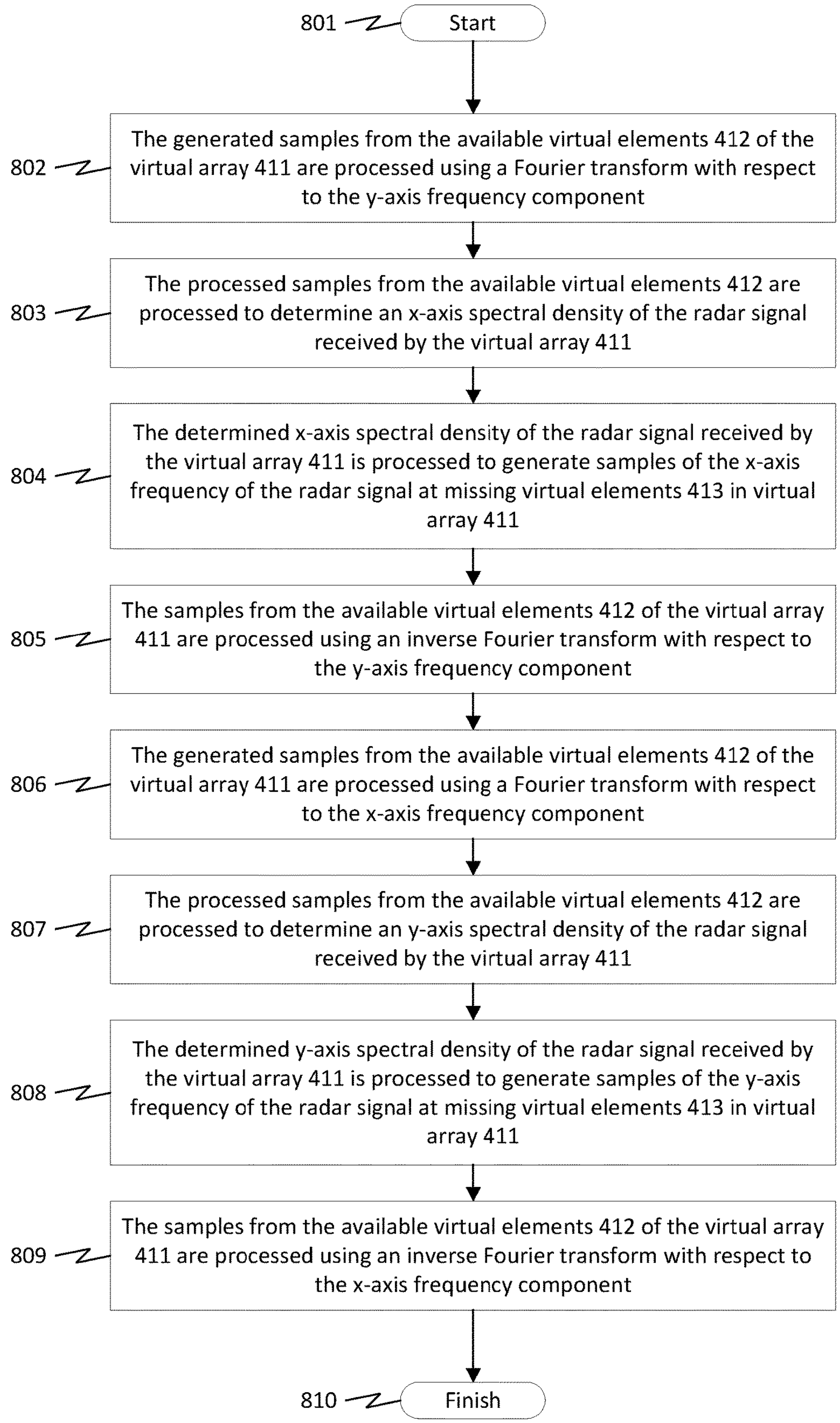
FIG. 8 is a flowchart of a second exemplary process of estimating samples of a radar signal for missing virtual antennas of a virtual array.

FIG. 8 is a flowchart illustrating an exemplary process of estimating samples of the radar signal at the missing virtual antennas 413 using Fourier transforms and 1D MIAA. To start, as shown by block 802 of FIG. 8, the generated samples of the radar signal from the available virtual antennas 412 may be processed using a Fourier transform with respect to the y-axis frequency component.

After processing the radar signals using the Fourier transform, an x-axis spectral density of the radar signal may be determined. Specifically, as shown by block 803 of FIG. 8, the processed samples of the radar signal from the available virtual antennas 412 may be processed to determine an x-axis spectral density of the radar signal (i.e., a spectral density of the radar signal with respect to the x-axis frequency). This process is broadly the same as that shown by block 602 of FIG. 6, with the main difference being the x-axis spectral density is two-dimensional (e.g., x-axis frequency and amplitude) rather than three dimensional (x-axis frequency, y-axis frequency, and amplitude).

After the x-axis spectral density of the radar signal is determined, samples of the x-axis frequency component of the radar signal from the missing virtual antennas 413 may be generated. Specifically, as shown by block 804 of FIG. 8, the determined x-axis spectral density of the radar signal may be processed to determine a value (e.g., a sample) of the x-axis frequency component of the radar signal at the location of each missing virtual antenna 413 in virtual array 411. This process is broadly the same as that shown by block 603 of FIG. 6, with the main difference being that only the x-axis frequency is determined.

After the samples of the x-axis frequency component of the radar signal at the missing virtual antennas 413 are determined, the Fourier transform of the samples of the radar signal from the available virtual antennas 412 may be reversed. Specifically, as shown by block 805 of FIG. 8, the generated samples of the radar signal from the available virtual antennas 412 may be processed using an inverse Fourier transform with respect to the y-axis frequency component.

After the samples of the radar signal from the available virtual antennas are processed using the inverse Fourier transform, the samples may again be processed with a Fourier transform. Specifically, as shown by block 806 of FIG. 8, the generated samples of the radar signal from the available virtual antennas 412 may be processed using a Fourier transform with respect to the x-axis frequency component.

After processing the radar signals using the Fourier transform, a y-axis spectral density of the radar signal may be determined. Specifically, as shown by block 807 of FIG. 8, the processed samples of the radar signal from the available virtual antennas 412 may be processed to determine a y-axis spectral density of the radar signal (i.e., a spectral density of the radar signal with respect to the y-axis frequency). This process is broadly the same as that shown by block 602 of FIG. 6, with the main difference being the y-axis spectral density is two-dimensional (e.g., y-axis frequency and amplitude) rather than three dimensional (x-axis frequency, y-axis frequency, and amplitude).

After the y-axis spectral density of the radar signal is determined, samples of the y-axis frequency component of the radar signal from the missing virtual antennas 413 may be generated. Specifically, as shown by block 808 of FIG. 8, the determined y-axis spectral density of the radar signal may be processed to determine a value (e.g., a sample) of the y-axis frequency component of the radar signal at the location of each missing virtual antenna 413 in virtual array 411. This process is broadly the same as that shown by block 603 of FIG. 6, with the main difference being that only the y-axis frequency is determined.

After the samples of the y-axis frequency component of the radar signal at the missing virtual antennas 413 are determined, the Fourier transform of the samples of the radar signal from the available virtual antennas 412 may be reversed. Specifically, as shown by block 809 of FIG. 8, the generated samples of the radar signal from the available virtual antennas 412 may be processed using an inverse Fourier transform with respect to the x-axis frequency component.

In some embodiments, the layout of the available antennas of the 2D MIMO array 402 may be selected so as to give optimal performance when used with the MIAA algorithm described in FIG. 6. In other words, the available and missing antennas of the 2D MIMO array 402 may be designed so that the estimated samples of the radar signal at the missing virtual elements 413 are with ten to twenty percent of the theoretical upper bound of accuracy that the algorithm could ever extract from the available information. One method of generating such an optimal antenna layout would be to initially designate the desired number of the available transmitter antennas 406 and the desired number of the available receiver antennas 409. Also initially designated are the total number of "slots" (i.e., the places an antenna could be placed) for the available transmitter antennas 406 and the total number of "slots" for the available receiver antennas 409. The difference between the number of available transmitter antennas 406 and the number of available slots for them is then the number of missing transmitter antennas 407. Likewise, the difference between the number of available receiver antennas 409 and the number of available slots for them is then the number of missing receiver antennas 410.

To determine an optimal antenna layout (for use with the MIAA algorithm) for this layout, one may then generate various layouts with the antennas randomly placed on one of their respective available slots. Each of these configurations could then be used in some number of trials in simulated environments to generate a radar signal and then detect the reflection of that radar signal off some number of objects. This detected signal could then be processed using MIAA to determine samples of the radar signal at the missing virtual elements of the virtual array formed by that particular antenna layout. Since this a virtual environment, the actual value of the radar signal at these virtual elements is known and can be compared to the values estimated by MIAA. The antenna layout that has the best average performance across the trials can then be selected.

The number of random antenna layouts needed to find one with ten to twenty percent of the optimal layout partially depends on the number of available antennas and the number of "slots" that they can be placed in. The greater either of these numbers are, the more possibilities there are and the larger number of random layouts that need to be tested to get optimal coverage. Empirically, for an antenna layout having five available transmitter antennas 407 and ten available receiver antennas 409, with 10 possible transmitter antenna slots and 20 possible receiver antenna slots, around 100,000 random configurations provides sufficient coverage. Additionally, around 50 random trials is normally sufficient to evaluate the relative performance of each antenna configuration. Note that this refers to purely random selection. More sophisticated selection techniques, such as various genetic algorithms, may arrive at near optimal antenna layouts (i.e., with twenty percent of the maximum theoretical performance given the amount of available information) using fewer random configurations.

Additionally, in some embodiments, the layout configuration may be done independently for the available transmitter antenna layout and the available receiver antenna layout. The best performing available transmitter antenna layout may then be paired with the best performing available receiver antenna layout.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The devices, modules, and other functional units described in this disclosure can be implemented by hardware, or software, or a combination of hardware and software. One of ordinary skill in the art will also understand that the above described devices, modules, and other functions units may be combined or may be further divided into a plurality of sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

Now, therefore, the following is claimed:

1. A method for processing radar signals, comprising:

obtaining a first plurality of samples of a radar signal, wherein:

each of the first plurality of samples of the radar signal is collected by one of a plurality of receiver antennas of a sparse multiple-input and multiple-output (MIMO) receiver array; and the radar signal comprises a plurality of mutually orthogonal radar sub-signals that are each generated by one of a plurality of transmitter antennas of a sparse MIMO transmitter array;

generating a second plurality of samples of the radar signal that each correspond to one of a plurality of available virtual antennas of a virtual array by:

extracting, from each of the first plurality of samples, sub-samples corresponding to the mutually orthogonal radar sub-signals; and using the extracted sub-samples to determine a sample of the radar signal for a corresponding available virtual antenna;

estimating a third plurality of samples of the radar signal that each correspond to one of a plurality of missing virtual antennas of the virtual array by:

calculating a first spectral density of the radar signal by:

generating a first phase steering matrix containing phase steering vectors for each of the second plurality of samples, wherein each of the phase steering vectors corresponds to a first frequency of the radar signal and has entries for a first plurality of sub-intervals of an interval of frequencies; and iteratively calculating a first target backscatter matrix using a first noise matrix, the generated first phase steering matrix, and the second plurality of samples, wherein the first noise matrix represents the interference and noise covariance of the second plurality of samples and is iteratively calculated using the first target backscatter matrix, the generated first phase steering matrix, and the second plurality of samples;

generating first frequency phase steering vectors for each of the third plurality of samples, wherein each of the first frequency phase steering vectors has entries for the first plurality of sub-intervals of the interval of frequencies;

calculating entries for each of the first frequency phase steering vectors for the third plurality of samples using the calculated first spectral density of the radar signal;

extracting a value associated with the first frequency of the radar signal for each of the third plurality of samples from the first frequency phase steering vectors; and estimating locations of one or more objects by using multi-dimensional folding to process the second plurality of samples and the third plurality of samples by:

generating a backward matrix and a product of a forward matrix with a target backscatter matrix;

retrieving parameters of the one or more objects from the backward matrix and the product of the forward matrix with the target backscatter matrix by:

retrieving values of complex envelopes of the one or more objects using the product of the forward matrix with the target backscatter matrix; and retrieving values of first frequency components and second frequency components of the one or more objects using the backward matrix; and calculating the location of the one or more objects using the retrieved parameters.

2. The method of claim 1, wherein:

the sparse MIMO receiver array and the sparse MIMO transmitter array are part of a two-dimensional (2D) MIMO array;

the radar signal is associated with the first frequency in a first direction and a second frequency in a second direction; and the virtual array is two-dimensional.

3. The method of claim 2, wherein:

calculating the first spectral density of the radar signal further comprises:

generating a second phase steering matrix containing phase steering vectors for each of the second plurality of samples, wherein each of the phase steering vectors corresponds to the second frequency of the radar signal and has entries for a second plurality of sub-intervals of an interval of frequencies; and iteratively calculating the first target backscatter matrix using the generated second phase steering matrix, wherein the first noise matrix represents the interference and noise covariance of the second plurality of samples and is iteratively calculated using the second target backscatter matrix; and estimating the third plurality of samples of the radar signal that each correspond to one of the plurality of missing virtual antennas of the virtual array further comprises:

generating second frequency phase steering vectors for each of the third plurality of samples, wherein each of the second frequency phase steering vectors has entries for the second plurality of sub-intervals of the interval of frequencies;

calculating entries for each of the second frequency phase steering vectors for the third plurality of samples using the calculated first spectral density of the radar signal;

extracting a value associated with the second frequency of the radar signal for each of the third plurality of samples from the second frequency phase steering vectors.

4. The method of claim 2, wherein estimating the third plurality of samples of the radar signal further comprises:

before calculating the first spectral density of the radar signal, processing the second plurality of signals using a Fourier transform with respect to the second frequency;

after extracting values associated with the first frequency of the radar signal for each of the third plurality of samples, processing the second plurality of signals using an inverse Fourier transform with respect to the second frequency;

before calculating a second spectral density of the radar signal, processing the second plurality of signals using a Fourier transform with respect to the first frequency;

calculating the second spectral density of the radar signal by:

generating a second phase steering matrix containing phase steering vectors for each of the second plurality of samples, wherein each of the phase steering vectors corresponds to the second frequency of the radar signal and has entries for a second plurality of sub-intervals of an interval of frequencies; and iteratively calculating a second target backscatter matrix using a second noise matrix, the generated second phase steering matrix, and the second plurality of samples, wherein the second noise matrix represents the interference and noise covariance of the second plurality of samples and is iteratively calculated using the second target backscatter matrix, the generated second phase steering matrix, and the second plurality of samples;

generating second frequency phase steering vectors for each of the third plurality of samples, wherein each of the second frequency phase steering vectors has entries for the second plurality of sub-intervals of the interval of frequencies;

calculating entries for each of the second frequency phase steering vectors for the third plurality of samples using the calculated second spectral density of the radar signal;

extracting a value associated with the second frequency of the radar signal for each of the third plurality of samples from the second frequency phase steering vectors; and after extracting values associated with the second frequency of the radar signal for each of the third plurality of samples, processing the second plurality of signals using an inverse Fourier transform with respect to the first frequency.

5. The method of claim 2, wherein:

the plurality of receiver antennas and the plurality of transmitter antennas number less than 3000 array antennas; and the MIMO array has an area less than 200 centimeters squared ($cm^2$).

6. The method of claim 1, wherein:

the sparse MIMO transmitter array transmits signals with a wavelength of around 3.9 millimeters (mm); and the objects parameters are determined with an angular resolution of at least 0.1° with regards to azimuth and with an angular resolution of at least 0.3° with regards to elevation.

7. The method of claim 1, wherein the sparse MIMO receiver array and the sparse MIMO transmitter array are configured to have a spacing and a layout that result in the estimated third plurality of samples of the radar signals being within twenty percent of a minimum error bound.

8. A system for detecting objects using a multiple-input multiple-output (MIMO) radar array, comprising:

a sparse transmitter array of the MIMO radar array comprising a plurality of transmitter antennas, wherein:

the sparse transmitter array is configured to generate and transmit a radar signal, and the radar signal includes mutually orthogonal radar sub-signals that are each generated by one of the plurality of transmitter antennas;

a sparse receiver array of the MIMO radar array comprising a plurality of receiver antennas, wherein:

the sparse receiver array is configured to obtain samples of the radar signal, and each of the samples of the radar signal is measured by one of the plurality of receiver antennas;

at least one processor configured to:

generate a second plurality of samples of the radar signal that each correspond to one of a plurality of available virtual antennas of a virtual array by:

extracting, from each of the first plurality of samples, sub-samples corresponding to the mutually orthogonal radar sub-signals; and using the extracted sub-samples to determine a sample of the radar signal for a corresponding available virtual antenna;

estimate a third plurality of samples of the radar signal that each correspond to one of a plurality of missing virtual antennas of the virtual array by:

calculating a first spectral density of the radar signal by:

generating a first phase steering matrix containing phase steering vectors for each of the second plurality of samples, wherein each of the phase steering vectors corresponds to a first frequency of the radar signal and has entries for a first plurality of sub-intervals of an interval of frequencies; and iteratively calculating a first target backscatter matrix using a first noise matrix, the generated first phase steering matrix, and the second plurality of samples, wherein the first noise matrix represents the interference and noise covariance of the second plurality of samples and is iteratively calculated using the first target backscatter matrix, the generated first phase steering matrix, and the second plurality of samples;

generating first frequency phase steering vectors for each of the third plurality of samples, wherein each of the first frequency phase steering vectors has entries for the first plurality of sub-intervals of the interval of frequencies;

calculating entries for each of the first frequency phase steering vectors for the third plurality of samples using the calculated first spectral density of the radar signal;

extracting a value associated with the first frequency of the radar signal for each of the third plurality of samples from the first frequency phase steering vectors; and estimate locations of one or more objects by using multi-dimensional folding to process the second plurality of samples and the third plurality of samples by:

generating a backward matrix and a product of a forward matrix with a target backscatter matrix;

retrieving parameters of the one or more objects from the backward matrix and the product of the forward matrix with the target backscatter matrix by:

retrieving values of complex envelopes of the one or more objects using the product of the forward matrix with the target backscatter matrix; and retrieving values of first frequency components and second frequency components of the one or more objects using the backward matrix; and calculating the location of the one or more objects using the retrieved parameters.

9. The system of claim 8, wherein:

the MIMO radar array is a two-dimensional (2D) MIMO radar array;

the radar signal is associated with the first frequency in a first direction and a second frequency in a second direction; and the virtual array is two-dimensional.

10. The system of claim 9, wherein:

calculating the first spectral density of the radar signal further comprises:

generating a second phase steering matrix containing phase steering vectors for each of the second plurality of samples, wherein each of the phase steering vectors corresponds to the second frequency and has entries for a second plurality of sub-intervals of an interval of frequencies; and iteratively calculating a second target backscatter matrix using the generated second phase steering matrix, wherein the first noise matrix is iteratively calculated using the second phase steering matrix; and estimating the third plurality of samples of the radar signal that each correspond to one of the plurality of missing virtual antennas of the virtual array further comprises:

generating second frequency phase steering vectors for each of the third plurality of samples, wherein each of the second frequency phase steering vectors has entries for the second plurality of sub-intervals of the interval of frequencies;

calculating entries for each of the second frequency phase steering vectors for the third plurality of samples using the calculated first spectral density of the radar signal;

extracting a value associated with the second frequency of the radar signal for each of the third plurality of samples from the second frequency phase steering vectors.

11. The system of claim 9, wherein estimating the third plurality of samples of the radar signal further comprises:

before calculating the first spectral density of the radar signal, processing the second plurality of signals using a Fourier transform with respect to the second frequency;

after extracting values associated with the first frequency of the radar signal for each of the third plurality of samples, processing the second plurality of signals using an inverse Fourier transform with respect to the second frequency;

before calculating a second spectral density of the radar signal, processing the second plurality of signals using a Fourier transform with respect to the first frequency;

calculating the second spectral density of the radar signal by:

generating a second phase steering matrix containing phase steering vectors for each of the second plurality of samples, wherein each of the phase steering vectors corresponds to the second frequency of the radar signal and has entries for a second plurality of sub-intervals of an interval of frequencies; and iteratively calculating a second target backscatter matrix using a second noise matrix, the generated second phase steering matrix, and the second plurality of samples, wherein the second noise matrix represents the interference and noise covariance of the second plurality of samples and is iteratively calculated using the second target backscatter matrix, the generated second phase steering matrix, and the second plurality of samples;

generating second frequency phase steering vectors for each of the third plurality of samples, wherein each of the second frequency phase steering vectors has entries for the second plurality of sub-intervals of the interval of frequencies;

calculating entries for each of the second frequency phase steering vectors for the third plurality of samples using the calculated second spectral density of the radar signal;

extracting a value associated with the second frequency of the radar signal for each of the third plurality of samples from the second frequency phase steering vectors; and after extracting values associated with the second frequency of the radar signal for each of the third plurality of samples, processing the second plurality of signals using an inverse Fourier transform with respect to the first frequency.

12. The system of claim 8, wherein:

the plurality of receiver antennas and the plurality of transmitter antennas number less than 3000 array antennas; and the MIMO array has an area less than 200 centimeters squared ($cm^2$).

13. The system of claim 8, wherein:

the sparse MIMO transmitter array transmits signals with a wavelength of around 3.9 millimeters (mm); and the objects parameters are determined with an angular resolution of at least 0.1° with regards to azimuth and with an angular resolution of at least 0.3° with regards to elevation.

14. The system of claim 8, wherein the sparse MIMO receiver array and the sparse MIMO transmitter array are configured to have a spacing and a layout that result in the estimated third plurality of samples of the radar signals being within twenty percent of a minimum error bound.

15. A non-transitory computer readable medium comprising instructions that, when executed by one or more processors, cause the one or more processors to detect objects using a multiple-input multiple-output (MIMO) radar array by:

obtaining a first plurality of samples of a radar signal, wherein:

each of the first plurality of samples of the radar signal is collected by one of a plurality of receiver antennas of a sparse multiple-input and multiple-output (MIMO) receiver array; and the radar signal comprises a plurality of mutually orthogonal radar sub-signals that are each generated by one of a plurality of transmitter antennas of a sparse MIMO transmitter array;

generating a second plurality of samples of the radar signal that each correspond to one of a plurality of available virtual antennas of a virtual array by:

extracting, from each of the first plurality of samples, sub-samples corresponding to the mutually orthogonal radar sub-signals; and using the extracted sub-samples to determine a sample of the radar signal for a corresponding available virtual antenna;

estimating a third plurality of samples of the radar signal that each correspond to one of a plurality of missing virtual antennas of the virtual array by:

calculating a first spectral density of the radar signal by:

generating a first phase steering matrix containing phase steering vectors for each of the second plurality of samples, wherein each of the phase steering vectors corresponds to a first frequency of the radar signal and has entries for a first plurality of sub-intervals of an interval of frequencies; and iteratively calculating a first target backscatter matrix using a first noise matrix, the generated first phase steering matrix, and the second plurality of samples, wherein the first noise matrix represents the interference and noise covariance of the second plurality of samples and is iteratively calculated using the first target backscatter matrix, the generated first phase steering matrix, and the second plurality of samples;

generating first frequency phase steering vectors for each of the third plurality of samples, wherein each of the first frequency phase steering vectors has entries for the first plurality of sub-intervals of the interval of frequencies;

calculating entries for each of the first frequency phase steering vectors for the third plurality of samples using the calculated first spectral density of the radar signal;

extracting a value associated with the first frequency of the radar signal for each of the third plurality of samples from the first frequency phase steering vectors; and estimating locations of one or more objects by using multi-dimensional folding to process the second plurality of samples and the third plurality of samples by:

generating a backward matrix and a product of a forward matrix with a target backscatter matrix;

retrieving parameters of the one or more objects from the backward matrix and the product of the forward matrix with the target backscatter matrix by:

retrieving values of complex envelopes of the one or more objects using the product of the forward matrix with the target backscatter matrix; and retrieving values of first frequency components and second frequency components of the one or more objects using the backward matrix; and calculating the location of the one or more objects using the retrieved parameters.

16. The non-transitory computer readable medium of claim 15, wherein:

the sparse MIMO receiver array and the sparse MIMO transmitter array are part of a two-dimensional (2D) MIMO array;

the radar signal is associated with the first frequency in a first direction and a second frequency in a second direction;

the virtual array is two-dimensional;

the instructions further cause the processors to calculate the first spectral density of the radar signal by:

generating a second phase steering matrix containing phase steering vectors for each of the second plurality of samples, wherein each of the phase steering vectors corresponds to the second frequency of the radar signal and has entries for a second plurality of sub-intervals of an interval of frequencies; and iteratively calculating the first target backscatter matrix using the generated second phase steering matrix, wherein the first noise matrix represents the interference and noise covariance of the second plurality of samples and is iteratively calculated using the second target backscatter matrix; and the instructions further cause the processors to estimate the third plurality of samples of the radar signal that each correspond to one of the plurality of missing virtual antennas of the virtual array by:

generating second frequency phase steering vectors for each of the third plurality of samples, wherein each of the second frequency phase steering vectors has entries for the second plurality of sub-intervals of the interval of frequencies;

calculating entries for each of the second frequency phase steering vectors for the third plurality of samples using the calculated first spectral density of the radar signal;

extracting a value associated with the second frequency of the radar signal for each of the third plurality of samples from the second frequency phase steering vectors.

17. A method for processing radar signals, comprising:

obtaining a first plurality of samples of a radar signal;

generating a second plurality of samples of the radar signal that each correspond to one of a plurality of available virtual antennas of a virtual array;

estimating a third plurality of samples of the radar signal that each correspond to one of a plurality of missing virtual antennas of the virtual array by:

calculating a first spectral density of the radar signal;

generating first frequency phase steering vectors for each of the third plurality of samples, wherein each of the first frequency phase steering vectors has entries for a first plurality of sub-intervals of an interval of frequencies calculated using the calculated first spectral density of the radar signal; and extracting a value associated with the first frequency of the radar signal for each of the third plurality of samples from the first frequency phase steering vectors; and estimating locations of one or more objects by using multi-dimensional folding to process the second plurality of samples and the third plurality of samples by:

generating a backward matrix and a product of a forward matrix with a target backscatter matrix;

retrieving parameters of the one or more objects from the backward matrix and the product of the forward matrix with the target backscatter matrix; and calculating the location of the one or more objects using the retrieved parameters.

18. The method of claim 17, wherein:

the first plurality of samples of the radar signal are obtained by a sparse two-dimensional (2D) MIMO array; and the radar signal is associated with the first frequency in a first direction and a second frequency in a second direction.

19. The method of claim 18, wherein estimating the third plurality of samples of the radar signal that each correspond to one of the plurality of missing virtual antennas of the virtual array further comprises:

generating second frequency phase steering vectors for each of the third plurality of samples, wherein each of the second frequency phase steering vectors has entries for a second plurality of sub-intervals of an interval of frequencies calculated using the calculated first spectral density of the radar signal; and extracting a value associated with the second frequency of the radar signal for each of the third plurality of samples from the second frequency phase steering vectors.

20. The method of claim 18, wherein estimating the third plurality of samples of the radar signal further comprises:

before calculating the first spectral density of the radar signal, processing the second plurality of signals using a Fourier transform with respect to the second frequency;

after extracting values associated with the first frequency of the radar signal for each of the third plurality of samples, processing the second plurality of signals using an inverse Fourier transform with respect to the second frequency;

before calculating a second spectral density of the radar signal, processing the second plurality of signals using a Fourier transform with respect to the first frequency;

calculating the second spectral density of the radar signal;

generating second frequency phase steering vectors for each of the third plurality of samples, wherein each of the second frequency phase steering vectors has entries for the second plurality of sub-intervals of the interval of frequencies calculated using the calculated second spectral density of the radar signal;

extracting a value associated with the second frequency of the radar signal for each of the third plurality of samples from the second frequency phase steering vectors; and after extracting values associated with the second frequency of the radar signal for each of the third plurality of samples, processing the second plurality of signals using an inverse Fourier transform with respect to the first frequency.

* * * * *